Jan. 19, 1971   E. H. BRINK   3,555,730
SEED CAPSULE AND METHOD OF MAKING SAME
Filed Feb. 6, 1969   2 Sheets-Sheet 1
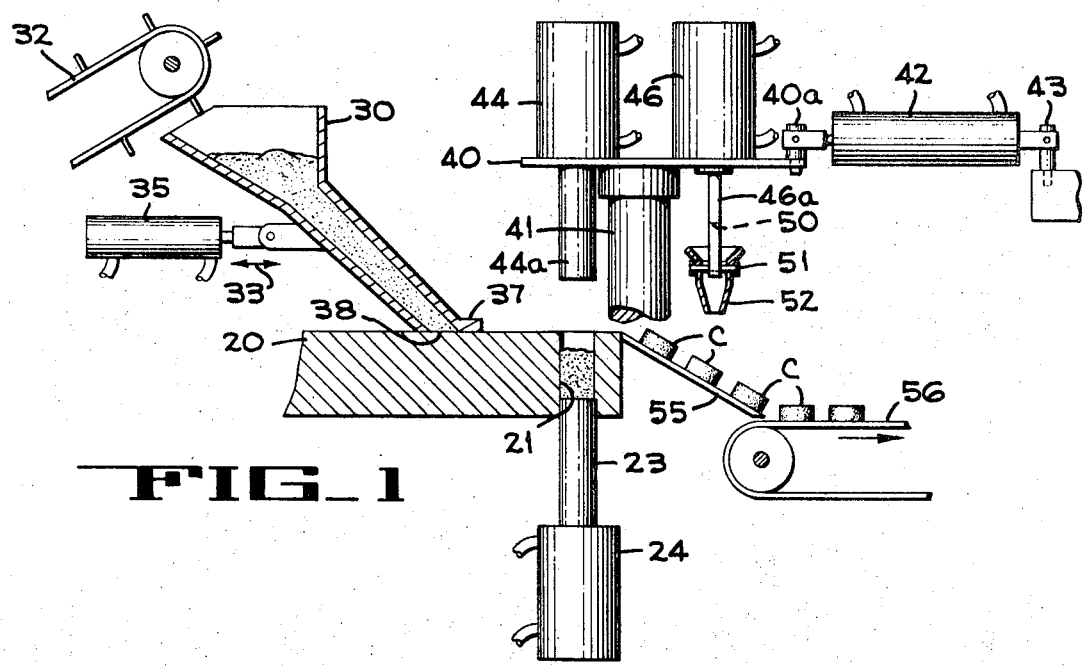
FIG_1
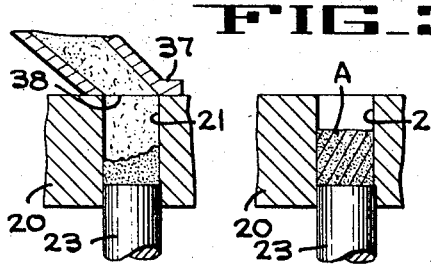
FIG_2
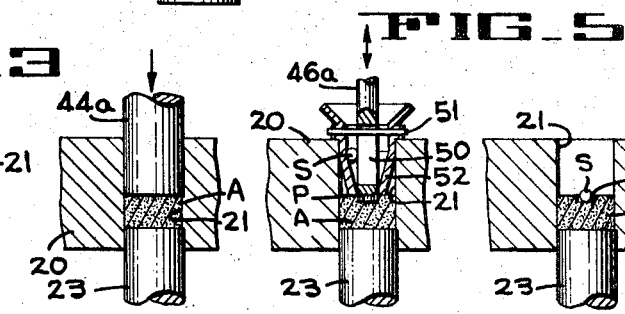
FIG_3   FIG_4   FIG_5   FIG_6
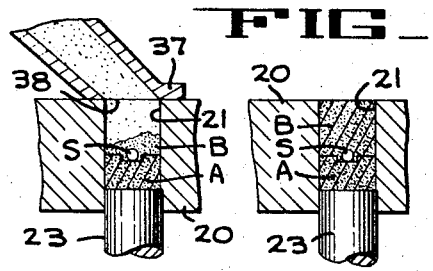
FIG_7
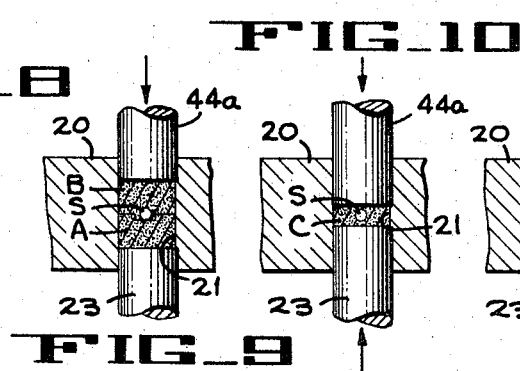
FIG_8   FIG_9   FIG_10
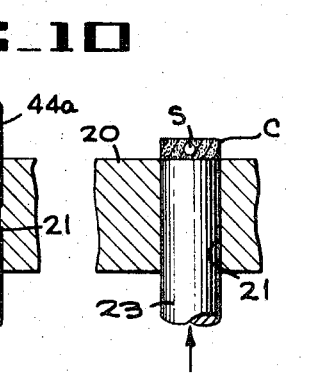
FIG_11
INVENTOR.
EDWIN H. BRINK
BY F. W. Anderson
C. C. Tripp
ATTORNEYS

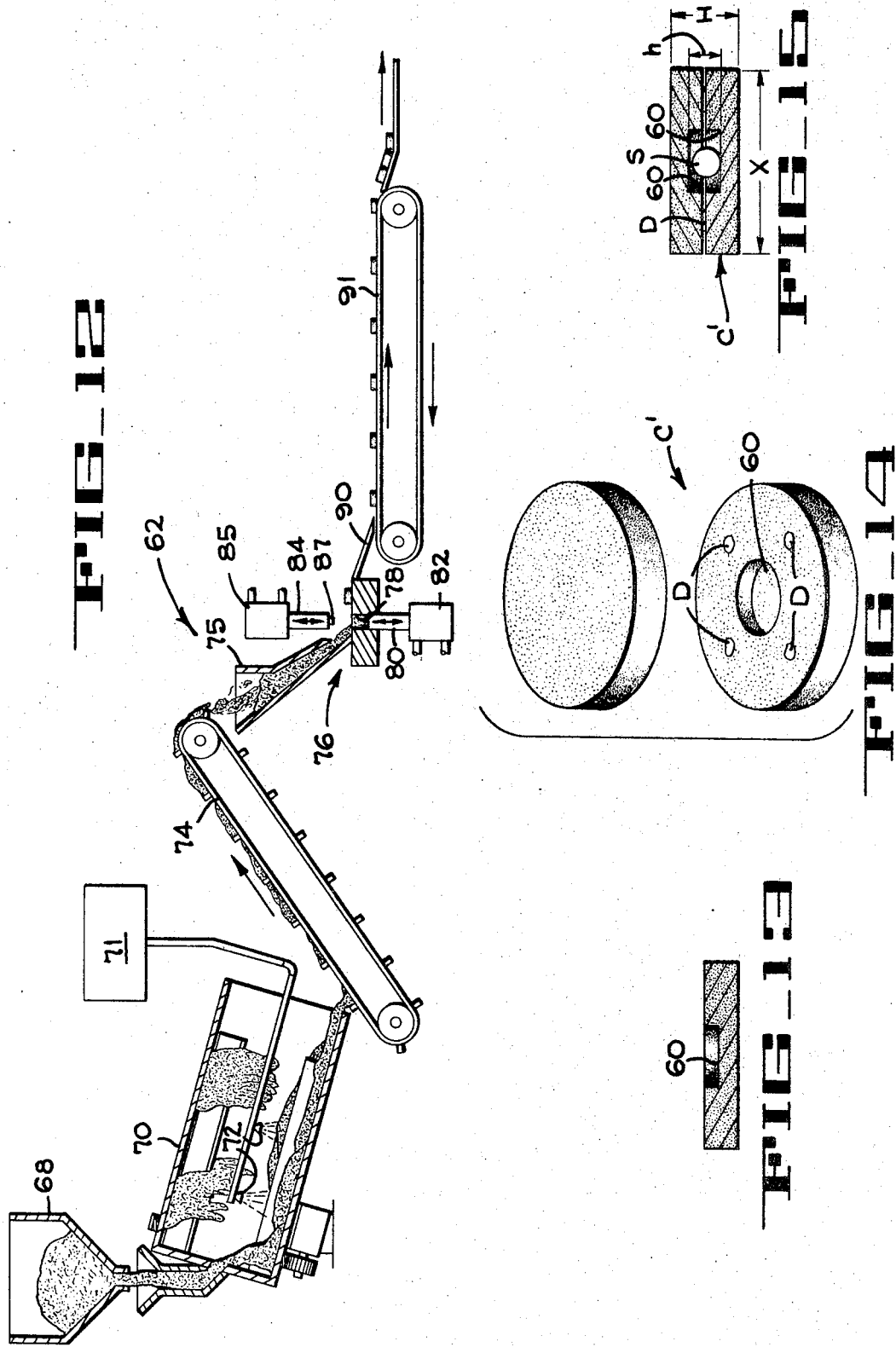

United States Patent Office 3,555,730
Patented Jan. 19, 1971

3,555,730
SEED CAPSULE AND METHOD OF
MAKING SAME
Edwin H. Brink, San Jose, Calif., assignor to FMC Corporation, San Jose, Calif., a corporation of Delaware
Filed Feb. 6, 1969, Ser. No. 799,149
Int. Cl. A01c 1/06
U.S. Cl. 47—57.6     3 Claims

ABSTRACT OF THE DISCLOSURE

One embodiment of seed capsule is formed by preparing a charge of seed bed material, such as vermiculite and a binder, compressing the charge to a predetermined compression value to form a lower capsule segment in the form of a relatively thin cylindrical member, forming an indent or pocket in the upper surface of the segment, placing a seed in the indent, depositing a second charge of material over the lower segment to cover the seed, compressing the second charge substantially to said predetermined compression value to form an upper capsule segment, and finally exerting pressure on both said upper and said lower segments to intimately join said segments into a single capsule form. In another embodiment, a seed capsule is formed by separately forming two capsule segments, placing a seed in indentations formed between the segments, and securing the segments together in spaced relation over most of their confronting area to provide vent passages to the seed chamber.

BACKGROUND OF THE INVENTION

This invention relates to the germination of seeds, and more particularly concerns an improved capsule in which a seed is carried and to improved methods of preparing seed capsules.

DESCRIPTION OF THE PRIOR ART

Various coverings have been proposed for seeds in order to increase germination or to make the planting of seeds easier and more efficient. The patents to Vogelsang No. 2,502,809, Hodges No. 1,645,001, Clawson No. 2,785,969, Scott No. 2,967,376, Tukacs No. 3,077,700, Eversole No. 3,113,399, and Legal et al. No. 3,316,676 disclose various protective coatings for seeds and various mixes in which the seed may be embedded. It has also been proposed to prepare a mix of vermiculite and a binder, such as polyvinyl acetate, embed a seed in the mix, and compress the mix to form a seed pellet. In the latter method, the fact that the seed is intermixed with the mix as the mix is compressed causes the seed to be subjected to fairly large unit pressures and possibly damaged.

SUMMARY OF THE PRESENT INVENTION

The present invention is concerned with the preparation of a seed capsule in such a manner that the capsule is strong enough to withstand the action of machinery used to handle, store and plant the capsule, and has a seed contained therein that is not detrimentally affected by the compressing forces that are applied to the capsule as it is being formed.

In general, the method of the present invention involves the concept of dividing the mix into two portions, partially compressing one portion and forming an indent or pocket therein, placing the seed in the pocket, depositing the second portion of the mix or top of the first portion and then compressing the entire mix to form the capsule. An important feature of the invention resides in the fact that, since the seed is disposed within the pocket surrounded by relatively uncompressed mix, it is partially protected from the full compression pressures and accordingly it is not subjected to excessive pressures as the capsule is formed.

The present invention also includes a novel method of making seed capsules to provide ventilating passages leading to the seed chamber of the capsule.

DESCRIPTION OF THE DRAWINGS

FIG. 1 is a schematic showing of an apparatus capable of forming the low pressure seed capsule of the present invention.

FIGS. 2–11 are enlarged schematic sectional views showing successive operations in the formation of a capsule with the apparatus of FIG. 1.

FIG. 12 is a schematic showing of an apparatus capable of forming a ventilated seed capsule according to the present invention.

FIG. 13 is a section taken centrally through one element of the seed capsule, which is made up of two identical elements.

FIG. 14 is an exploded view of the seed capsule, particularly showing the four spacer members that hold the two elements of the capsule in slightly spaced relation.

FIG. 15 is a section taken centrally through a completed capsule.

In FIG. 1, the reference numeral 20 indicates generally a fixed table having a cylindrical passage 21 therethrough adjacent one edge. A piston 23 of a double acting hydraulic cylinder 24, that is mounted in fixed position below the table, is adapted to slide snugly in the passage 21.

A hopper 30, which is adapted to receive mix from a supply conveyor 32, is mounted for reciprocating movement in the direction of the arrow 33 under the control of a double-acting hydraulic cylinder 35. The hopper has a lower foot portion 37 that slides along the table in supported relation and is provided with a discharge opening 38 by which charges of the mix may be dispensed. It will be noted in FIG. 2 that when the discharge opening 38 is moved into registry with the passage 21, the mix flows into the passage, and the amount of mix so discharged can be controlled by the time that the opening remains in communication with the passage, as dictated by the actuation of the power cylinder 35.

A turret plate 40 (FIG. 1) is mounted above one end of the table 20 for oscillating movement about a stationary vertical shaft 41 under control of a hydraulic cylinder 42 which is pivotally connected to a fixed pin 43 and to a pin 40a on the turret 40. A pair of hydraulic cylinders 44 and 46 are mounted in fixed upright position on the turret plate, cylinder 44 having a piston rod 44a extending downwardly through the turret and cylinder 46 having a piston rod 46a also extending through the plate.

The axis of the rods 44a and 46a are at the same distance from the axis of the fixed shaft 41, and the distance is so chosen that during oscillation of the turret plate, the piston rods alternately come into registration with the passage 21 in the table 20. Also, the stroke of the cylinder 42 is selected so that, when it is actuated to move its piston in one direction, one of the piston rods 44a or 46a moves into registry with passage 21 and, when it is actuated to move its piston rod in the other direction, the other piston rod 44a or 46a is positioned above the passage 21.

As seen in FIG. 5 the piston rod 46a is provided with a slot 50 which receives a cross-pin 51 that extends between and is secured to the side walls of a seed-guiding and centering funnel 52. In the position of FIG. 1, the piston rod 46a has lifted the funnel to an elevated position, acting through the cross-pin 51. In FIG. 5 the rod has lowered the funnel into the passage 21 until an annular shoulder on the funnel engages the table 20. The rod 46a then continues downwardly through the opening in the lower end of the funnel.

In operation, with the lower piston 23 in the position of FIG. 2, the cylinder 35 is actuated to move the discharge port 38 of the hopper into registery with the passage 21. After a short interval, the cylinder is again activated to move the hopper back to the position of FIG. 1, resulting in a predetermined charge A (FIG. 3) being deposited in the passage 21. At this time, the cylinder 44 is above the passage 21 and, when the cylinder is activated to move the piston rod 44a downwardly, the rod enters the passage 21 and partially compacts the mix between the piston rods 44a and 23, as seen in FIG. 4. The rod 44a is then raised, and the cylinder 42 is activated to move rod 44a away from passage 21 and to swing the guide funnel 52 into position over the passage 21. Cylinder 46, causing actuated to lower the funnel into the passage 21, causing an annular shoulder on the funnel to come to rest on the table at the edge of passage 21, thus arresting the downward movement of the funnel in the position of FIG. 5. After the funnel stops its downward movement, the piston rod 46a continues downward and makes a pocket P in the partially compacted charge A.

While the cylinder 46 is deactivated and the piston rod 46a is in the lowered, pocket-forming position, a seed S is manually dropped into the funnel. Since the rod 46a is in the lowered position, the seed cannot move out of the funnel through its lower end.

After a predetermined interval, the cylinder 46 is activated to lift the rod 46a, permitting the seed to slide down the funnel and be guided into the pocket P. Continued upward movement of the rod 46a brings the wall at the lower end of the slot into engagement with the crosspin 51, and the funnel is then lifted out of the passage 21, leaving the seed S in the pocket P. The cylinder 42 is then actuated to again move piston rod 44a to a position above passage 21.

The cylinder 35 is again activated to cause the hopper to deposit a second charge B of mix into the passage 21. Piston rod 44a is then moved downwardly to partially compress the charge B. When the rod 44a reaches a predetermined position in its downward movement, the lower piston rod 23 is raised. Accordingly, as seen in FIG. 10, the two rods 23 and 44a coact to compress the capsule C to its final form.

As the rod 44a is retracted upwardly, the rod 23 continues upwardly to raise the capsule C to a position approximately at the level of the top surface of the table for removal and drying. A typical capsule would be in the form of a cylinder ¾ inch in diameter and ¼ inch thick. As seen in FIG. 1, each capsule C is arranged to be pushed off table 20 onto a slide 55 for delivery to a conveyor 56.

In FIGS. 14 and 15 is illustrated a capsule C' formed of two identical halves. This capsule is made by forming each half with an indent 60 therein, depositing a seed S in the indent of one half, placing small deposits D of a heavy glue or binder on the capsule half, and then inverting the other capsule half and pressing it into engagement with the deposits D. It will be noted in FIG. 15 that the deposits D have a sufficient thickness to hold the seed halves in spaced relation, thus providing a vent passageway that will facilitate access of oxygen to the seed S.

In FIG. 12, one form of mechanism 62 capable of forming the capsule halves is illustrated. This mechanism comprises a hopper 68 which contains a supply of exfoliated vermiculite. A grade 4 expanded vermiculite, which is made by the Zonolite Division of W. R. Grace Co. Chicago, Ill. and has a particle size such that all of it will pass through a 10 mesh screen and 90% of it will be caught on a 100 mesh screen, has been found suitable for these capsules. The vermiculite is guided into a power driven mixer 70 which has blades and mixing elements that tumble the vermiculite while a binder such as polyvinyl acetate in latex form is pumped from a tank 71 and sprayed into the vermiculite through nozzles 72. The action is such that a homogeneous mixture of vermiculite and binder is discharged onto a conveyor belt 74, which delivers the mix to a hopper 75 of a tabletting press 76.

From the lower end of the hopper 75, a charge of the mix is moved into a cavity 78 of the press, the bottom of said cavity being formed by the top surface of a cylindrical plunger 80 that projects from a double-acting hydraulic power cylinder 82. A second cylindrical plunger 84, which projects from a double-acting hydraulic cylinder 85, overlies the cavity 78 and is provided with a reduced-diameter central projection 87 on its lower surface. The actuation of the power cylinders is so controlled that, starting from the position shown in FIG. 12, the upper plunger 84 is forced downwardly to enter the cavity 78 and compress the mix therein against the resistance of the stationary plunger 80 to form the capsule member into the configuration shown in FIG. 13 forming the indent or pocket 60 in the member. The upper plunger 84 is then raised, followed by the lower plunger 80 which raises the capsule member to a position above the upper edges of the cavity. The capsule member is then removed manually, or by a suitable stripper member, and directed down a chute 90 to a processing conveyor 91. The capsules are then dried by subjecting them to a temperature of about 140° F. for about two hours or to room temperature for a suitable period.

After the capsule members are dried, a worker drops a single seed S in the pocket 60 of one capsule member, places several deposits D of a heavy glue or binder such as polyvinyl acetate at spaced points on the capsule member, inverts another capsule member, and presses it onto the deposits D to form the vented capsule of FIG. 15.

The seed bed material for the capsules C and C' has been successfully made from the aforementioned grade No. 4 mix of exfoliated vermiculite and polyvinyl acetate. The material has been compressed into capsules in a hand-operated tabletting press marketed by Pharmaceutical Supply Company of New York, N.Y., under the designation Engler Tabletting Press, Model No. A/B. The mix was compressed at a 6:1 compaction ratio and dried so that the final capsule had a composition of 95% vermiculite and 5% binder solids. Mix compressed at a ratio of 4:1 has been found satisfactory but capsules made of mixes at a lower compaction ratio have not always proved sufficiently durable to withstand handling before and during the planting operation. A mix ratio of 8:1 has also been found satisfactory but capsules made of higher compaction ratios tend to be too hard, impeding the absorption of moisture necessary for germination and impeding the emergence of the seedling.

As seen in FIG. 15, a typical capsule may have a diameter X or ¾", and a height H of ¼", and a capsule cavity that is ¼" in diameter and ⅛" total height $h$.

The polyvinyl acetate binder may be any commonly available latex type. While the seed S has been illustrated diagrammatically as a sphere it will be understood that seeds take many shapes and forms.

While apparatus has been diagrammatically illustrated to carry out the novel methods of forming the capsules C and C', it should be understood that the methods can be carried out by manual manipulation.

From the foregoing description it will be apparent that the present invention provides seed capsules that have particularly advantageous characteristics. The capsule C of FIG. 11 is prepared by a method that precludes excessive, detrimental pressure on the seed. The capsule C' of FIG. 15 has unique venting features not heretofore available for seed capsules.

Although the best mode contemplated for carrying out the present invention has been herein shown and described, it will be apparent that modification and variation may

What is claimed is:

1. A seed capsule comprising two compressed generally cylindrical capsule members, means for securing said members together in closely spaced relation, means defining a seed cavity between confronting faces of said members, and a seed disposed in said cavity, said securing means comprises a plurality of deposits of an adhesive material, which when hardened, provide a vent passageway between the members sufficient to facilitate access of oxygen and moisture to said seed.

2. A capsule according to claim 1 wherein said adhesive is polyvinyl acetate.

3. A capsule according to claim 1 wherein said seed cavity is defined by a recess in each confronting face of said members.

References Cited

UNITED STATES PATENTS

| | | | |
|---|---|---|---|
| 2,785,969 | 3/1957 | Clawson | 71—64 |
| 2,967,376 | 1/1961 | Scott | 47—57.6 |
| 3,284,209 | 11/1966 | Kelley | 47—57.6UX |

ROBERT E. BAGWILL, Primary Examiner

PO-1050
(5/69)

UNITED STATES PATENT OFFICE
CERTIFICATE OF CORRECTION

Patent No. 3,555,730          Dated January 19, 1971

Inventor(s) Edwin H. Brink

It is certified that error appears in the above-identified patent and that said Letters Patent are hereby corrected as shown below:

Col. 1, line 69, change "or" to -- on --.

Col. 3, line 18, delete "causing" and insert -- is then --.

Signed and sealed this 4th day of January 1972.

(SEAL)
Attest:

EDWARD M. FLETCHER, JR.          ROBERT GOTTSCHALK
Attesting Officer          Acting Commissioner of Patents